United States Patent [19]

Klein

[11] Patent Number: 4,716,062

[45] Date of Patent: Dec. 29, 1987

[54] COMPOSITE MATERIALS, THEIR PREPARATION AND ARTICLES MADE THEREFROM

[76] Inventor: Max Klein, P.O. Box 3, Dalton, Mass. 01226

[21] Appl. No.: 796,929

[22] Filed: Nov. 8, 1985

[51] Int. Cl.[4] .............................. C08J 5/02; B32B 5/06
[52] U.S. Cl. ..................................... 428/36; 428/297; 428/515; 524/35; 524/439; 524/440; 524/441; 524/528; 525/130; 525/177
[58] Field of Search ................. 524/35, 439, 440, 441, 524/528, 130, 177; 428/36, 138, 515, 297

[56] References Cited

U.S. PATENT DOCUMENTS

| | | |
|---|---|---|
| 4,003,874 | 1/1977 | Ide et al. .............................. 524/586 |
| 4,186,123 | 1/1980 | Kietzman ............................. 524/388 |
| 4,207,378 | 6/1980 | Klein .................................... 428/407 |
| 4,426,470 | 1/1984 | Wessling et al. ...................... 524/35 |

*Primary Examiner*—John E. Kittle
*Assistant Examiner*—James J. Seidleck
*Attorney, Agent, or Firm*—Dann, Dorfman, Herrell & Skillman

[57] ABSTRACT

High strength, light weight composite material, comprising discrete reinforcing elements surrounded by a matrix including polymer micro-bits that are substantially free of the intact cells of the expanded, hydrophobic, thermoplastic polymers from which they are produced, is prepared by hot pressing paper-like elements made using paper making technology.

26 Claims, No Drawings

COMPOSITE MATERIALS, THEIR PREPARATION AND ARTICLES MADE THEREFROM

BACKGROUND OF THE INVENTION

The present invention relates to composite materials, their method of preparation, as well as aqueous dispersions and paper-like sheets or webs used in said method, and to composite structures and articles made from the composite materials.

The term "composite material" as used herein, refers to combinations of two or more materials, in sheet or web form, comprising a continuous matrix phase which surrounds a reinforcing phase composed of discrete reinforcing elements. Composite materials are used in the manufacture of a wide variety of articles including automotive springs, brake pads, chemical processing equipment, air foils and fuselage structures for aircraft, helicopter blades, boat hulls, and sporting goods, such as golf clubs (shafts), baseball bats, skis and tennis rackets (frames). Such structures are commonly produced using so-called continuous fiber methods of fabrication, in which the composite material must be carefully consolidated by means of pressure and vacuum to eliminate porosity and insure complete coalescence of the matrix phase, so as to avoid non-homogeneity in the final product. These fabrication methods often require specilized equipment which adds to the capital expenditure and operating cost involved in manufacturing such structures.

Relatively recently, composite materials have reportedly been prepared from solid polymer, reinforcing material and a latex binder by an aqueous method employing conventional paper-making equipment and processes. See, for example, U.S. Pat. No. 4,426,470 which specifically describes the preparation of composite sheets using high density polyethylene as the solid polymer, glass fibers as the reinforcing material, and various latex binders of substantially water-insoluble organic polymers having either anionic or cationic bound charges. The aqueous slurries reportedly used in producing composite materials by paper-making techniques must be carefully formulated in order to obtain a satisfactory product. Special care must be taken to avoid accumulation of loose powdered polymer or resin on the surface of the paper-like web from which the composite material is prepared. The surface accumulation of loose powdered polyolefins, for example, interferes with the proper functioning of the paper-making equipment, due to the propensity of the powdered polymer to become deposited on and adhere to the heated surfaces of the drying apparatus with which the wet web or sheet comes into contact during the paper-making operation.

Special flocculants and dispersion aids have been proposed to alleviate problems caused by the surface accumulation of powdered polymer or resin. The use of such additives, however, increases the manufacturing cost of the composite material. Moreover, depending on the specific combination of components used in making the composite material, certain dispersion aids may impair the physical integrity, or otherwise adversely effect desirable characteristics of the final products. For example, when concentrated sulfuric acid is used as a dispersion aid in the production of glass fiber-containing composites, the finished mat is unusually brittle; and when a neutral dispersion aid, such as Lubrizol TM or Katapol TM is employed, and the composite material is converted to a laminated product, individual plies of the product tend to peel apart.

Another undesirable characteristic of the composite materials produced heretofore by paper-making techniques is the occurrence of "edge bleeding", which is manifested by the flow of resin beyond the periphery of the network of reinforcing elements within the body of the composite. These drawbacks have made processes for the wet lay preparation of composite material proposed heretofore, and the resultant composite material, unattractive for commercial exploitation.

SUMMARY OF THE INVENTION

It has now been discovered, in accordance with the present invention, that composite materials can be efficiently produced using paper-making technology, by including polymer micro-bits in the heat fusible sheet or web from which the composite material is prepared. The polymer micro-bits substantially eliminate accumulation of powdered polymer or resin on the sheet or web, and serve to maintain all of the components of the composite material uniformly distributed throughout the final product. Use of the polymer micro-bits also effectively eliminates the occurrence of edge bleeding.

According to one aspect of the present invention there is provided composite material in the form of a sheet or web comprising a continuous matrix phase which surrounds a reinforcement phase composed of discrete reinforcing elements, the continuous matrix phase comprising heat fused polymer micro-bits produced from an expanded, hydrophobic, thermoplastic polymer which is non-brittle in expanded form, the polymer micro-bits being substantially free of intact cells of the expanded or foamed polymer from which they are produced. These composite materials have a variety of applications, including, but not limited to, furniture board, grinding wheels, low friction bearings and packings, bullet-proof shields, and a variety of sporting equipment.

According to another aspect of this invention, there is provided a composition of matter, in the form of a uniform aqueous dispersion including the aforesaid polymer micro-bits and one or more reinforcing elements for the composite material, which composition is used as the furnish for the preparation of the composite material, using conventional paper-making equipment and processees. Aqueous dispersions containing the polymer micro-bits enable the formation of consistently uniform, heat fusible sheets or webs which are readily converted into the finished composite material.

The heat fusible sheets or webs, formed in an intermediate stage of composite material production, constitute a further aspect of the present invention.

According to yet another aspect of this invention, there is provided a process for the production of the aforementioned composite material which comprises forming a wet sheet or continuous web of the disperse phase of the above-mentioned aqueous dispersion, drying the sheet or web and heating the sheet or web sufficiently to transform the polymer micro-bits to a continuous matrix phase surrounding the reinforcing elements, thus yielding the composite material.

Other aspects and advantages of this invention will be apparent to those skilled in the art upon reading the following detailed description thereof.

DETAILED DESCRIPTION

The specific combination of components used in the practice of this invention results in composite material having a number of desirable properties, including thermoformability, relatively light weight, high strength, dimensional stability and resistance to deformation. These characteristics are maintained over wide variations in temperature and humidity. The composite materials of this invention are also extremely resistant to water absorption.

The principal components of the composite material are polymer micro-bits and finely divided, hydrophobic, thermoplastic resin, which go into the matrix phase, and at least one reinforcing element constituting the reinforcing phase. Additional components, such as a binder, may be used in fabricating the composite material, as will be described below.

A. The Matrix Phase

The matrix phase generally constitutes from about ten to about seventy percent by weight of the finished composite material. The polymer micro-bits component of the matrix phase is produced from any expanded, hydrophobic, thermoplastic polymer, which is non-brittle in expanded form. A significant characteristic of the polymer micro-bits is that they are substantially free of intact cells of the expanded polymer starting material from which they are produced. Preferably, the starting material for the polymer micro-bits is selected from the group of non-brittle, expanded, hydrophobic, thermoplastic styrene polymers, lower polyolefins, or co-polymers or blends of such polymers. The lower polyolefins may be derived from any ethylenically unsaturated hydrocarbon monomer having from 2 to 6 carbon atoms, e.g. polyethylene, polypropylene, polybutylene or polymethylpentene. The term "non-brittle", as used herein, is intended to signify that the polymer starting materials are relatively flexible, generally having a density of five pounds/cubic foot, or less. Styrene-polymers whose density is from one to two pounds/cubic foot are especially suitable for the production of micro-bits.

Micro-bits of expanded, hydrophobic, thermoplastic styrene-polymers or lower polyolefins are more fully described, along with their process of preparation, in my U.S. Pat. No. 4,207,378, issued Apr. 29, 1980, the entire disclosure of which is incorporated in this application by reference as if actually set forth herein in full. Basically, the micro-bits are prepared by disintegrating the polymer starting material, in the form of expanded polymer bit pieces, using a comminuting machine such as the one described in my aforementioned U.S. Pat. No. 4,207,378 (column 4, line 22 to column 5, line 35). The resultant micro-bits, in addition to being substantially free of intact cells of the expanded polymer from which they are produced, typically also have the following characterstics: (a) particle size range from about 40 to about 325 microns long, from about to 20 to about 320 microns wide and about 0.5 microns thick, (b) shape which is substantially non-uniform in outline, and (c) density which is about 85 percent or more of the density of the specific unexpanded polymer from which the expanded polymer starting material is produced. The surface area of the polymer micro-bits is approximately six square meters per gram. When viewed under a scanning electron microscope (SEM), magnified to 1000 times actual size, the micro-bits have the appearance of a crumpled sheet of paper, marked by irregular undulations and having numerous wrinkles, creases and folds. Examination by SEM also reveals what appears to be extended apart and distorted outlines of ruptured boundaries of what before disintegration was an expanded honeycomb array of regular geometrical cross sections of cells.

By reason of their unique physical characteristics, the polymer micro-bits facilitate preparation of the aqueous dispersion from which the composite material is made. The micro-bits serve as a dispersion aid, helping to uniformly distribute the solid components of the composite throughout, and maintaining the stability of, the aqueous dispersion. Even low specific gravity powdered resins, such as polyolefins and polycarbonates are uniformly distributed and maintained in suspension by the micro-bits. The polymer micro-bits also serve to retain in the heat-fusible, paper-like sheet or web the solid components from which the sheet or web is made. Approximately twenty to one hundred weight percent of the matrix phase may be polymer micro-bits. The micro-bits preferably constitute from about twenty to about sixty weight percent of the matrix phase.

It has been discovered that composites having particularly desirable physical properties are obtainable using polystyrene micro-bits. This discovery is contrary to conventional thinking about the use of polystyrene in composite materials. Polystyrene is generally regarded as a relatively brittle material which is not particularly suited for use in composite formulations. For example, it is generally believed that polyethylene and/or polycarbonate, which are commonly used in composite formulations, are incompatible with polystyrene because a melt mixture of these polymers would be deficient in important physical properties including tensile, impact and flexual strength, as well as heat resistance. The inclusion of reinforcing elements in such a resin mixture would tend to further adversely affect those properties. It was quite surprising, therefore, to find that the inclusion of polystyrene in the form of micro-bits, having the physical characteristics described above, in the composite material of the present invention actually enhances the physical properties exhibited by the finished products.

The matrix phase may also include various finely divided, hydrophobic, heat fusible resins. These include polycarbonates, polyolefins, including low and high molecular weight polyethylene and polypropylene and co-polymers thereof, polyester, nylon, polyacetals, chloropolymers, including chlorinated ethylene and polyvinyl chloride, fluoropolymers, including polytetrafluoroethylene, acrylic resins, acrylonitrile-butadiene-styrene (A.B.S.) polymers and the like. Polymer blends or melt alloys of the foregoing polymers may also be used if desired. These resins are finely divided to particle size in the range of 1 to 425 microns. These thermoplastic, heat fusible resin powders, when used, may constitute up to about seventy weight percent of the matrix phase. Preferably the resin powder component of the matrix phase is in the range of about forty to about seventy weight percent. In general, at least ten percent by weight of polymer micro-bits, based on the total weight of the matrix is required to achieve a high loading (sixty weight percent or higher) of the resin powder.

B. The Reinforcement Phase

The reinforcement phase normally constitutes about thirty to about ninety percent by weight of the finished composite material. The reinforcing elements that make up the reinforcement phase may be in fibrous or particulate form. The fibrous reinforcing elements may be selected from the group of glass, carbonaceous, polymer (both natural and synthetic), inorganic, and metal fibers. The fibrous reinforcing elements are preferably cellulosic materials, such as hard wood pulp fibers, or mixtures of fiber-containing pulps, produced as a waste product of paper making operations. These pulps generally have a freeness of 350 or less. Other cellulosic fibers which may be used include those derived from semi-refined plant material, e.g. processed ceral grasses, such as rice straw. Thus, a variety of fibers having utility in the practice of this invention are obtainable from source materials which otherwise have no practical utility. These fibrous reinforcing elements are preferred because they yield light weight, high strength composites at relatively low cost. It is preferable to include glass micro-fibers in the composite material for strength enhancement. Synthetic polymer fiber reinforcing elements impart desirable qualities to the finished composite material, but are more expensive than the pulp fibers mentioned above. Satisfactory composites have been obtained using aromatic polyamide and/or polytetrafluoroethylene (PTFE) fibers. Composites containing Kevlar ®fibers, for example, have been found to have exceptional physical properties, including very high strength and heat resistance. Composites having good physical properties and excellent high temperature resistance have also been obtained using Nomex ® fibers, which are formed from a copolymer of meta-phenylenediamine and isophthaloyl chloride. Suitable nylon fiber lengths are from about 0.5 cm. to about 1.5 cm.

In preparing the composite material of the present invention it is desirable to utilize an intimate blend or cobeat prepared from the above-described polymer micro-bits and cellulosic fibers. The cellulosic fibers may be cotton fibers, e.g. cotton linters or cellulose fibers from other sources, such as woodpulp from both soft and hard woods. The "cobeat" is so named because, after forming a uniform dispersion of the cellulose fibers and polymer micro-bits in a paper-making pulper, for example, the dispersion is fed into a beater and subjected to beating action until its freeness is within the range of about 400 to about 450. Freeness is generally understood by those skilled in the art to be a measure of the rate of flow of water through a pulp and is determined in accordance with Tappi Standard T227-m-58 (also referred to as Canadian Standard Freeness). The higher the freeness value, the higher the rate of flow of water through the pulp. A relatively minor amount of one or more non-shrinkable, fiber-forming polyester, preferably polyester terephthalate fibers, e.g. Trevira ® 101, may be included in the cobeat in order to enhance the wet tear strength of the paper-like elements from which the composite material is fabricated. The cobeat preferably is composed of about 35 to about 50 weight percent of polymer micro-bits and from about 50 to about 65 weight percent cellulose fiber, with the polyester, when used, constituting up to about seven percent of the total of the cellulose fiber and micro-bits.

The cobeat dispersion may be used as is, or it may be converted to a continuous web using conventional paper-making processes and apparatus, the latter being preferred. After adequate drying, the cobeat web becomes a storable product which is available when required for making the composite material. The cellulose fibers and polyester fibers may be added separately in preparing the furnish, if desired. The procedure for preparing the cobeat is described in detail in Example 1 of my U.S. Pat. No. 4,293,378, the entire disclosure of which is incorporated in the present application by reference, as if set forth herein in full.

One of the advantages in using the cobeat in making the composite material is that it aids in forming a uniform, homogeneous aqueous dispersion of the composite components. The cobeat also serves to enhance retention of particulate components of the web or sheet material when present therein.

The particulate reinforcing elements may be selected from the group of diatomaceous earth, polyurethane micro-bits, aluminum oxide, wood flour, saw dust, carbon powder, (including finely divided graphite), silicon dioxide, calcium carbonate, mica, various low cost clays, and the like.

A commercially available diatomaceous earth which may be used advantageously in the present invention is supplied by the Manville Corporation under the name "Hi-Flow Supercel", which has a median particle size of 18 microns, a median pore size of 7 microns, and a softening point of 982° C. In addition to serving as a relatively low cost filler, the diatomaceous earth is believed to assist in uniformly dispersing the resin powder in the furnish and in checking the occurrence of edge bleeding during heat fusing of sheets of the composite material.

Polyurethane micro-bits and their preparation are described in my U.S. Pat. No. 4,200,679, the entire disclosure of which is incorporated in the present application by reference, as if written out herein in full.

The selection of any specific reinforcing element will, of course, be determined primarily by the end use contemplated for the finished composite material.

C. Other Components

Composite materials made in accordance with the present invention may also contain a variety of other components for imparting properties that are beneficial during wet web or sheet formation or in the finished product, or both. When non-fibrilated fibers, e.g. glass fibers, are incorporated in the composite material, it is necessary to add to the furnish a relatively minor amount of a compatible binding agent in order to provide the web or sheet with the degree of physical integrity required during processing. The compatible binding agent is employed in an amount effective for binding the points of contact of the fibrous components of the composite material. The binding agent should be insoluble in cold water, soluble in hot water, and retain its binding action upon cooling. A suitable organic binding agent satisfying these criteria is polyvinyl alcohol (PVA). It is preferable for purposes of the present invention to use PVA fibers to achieve uniform dispersion of the components in the furnish used in making the composite material. PVA is essentially insoluble in cold water but tends to quickly dissolve in water at temperatures above 140° F. and this property may be used to advantage during production of the composite material. After the wet web is removed from the porous support, it is passed under a high temperature infra-red heating panel which heats the web causing the PVA fiber to soften, swell and solubilize in the water present in the web. The solubilized polyvinyl alcohol tends to flow to the points of contact between the fibers, and accumulate there so that when the paper-like element is completely dried, the solid PVA binds the fibers of the sheet material together. It has been found that the addition of PVA fiber, in an amount up to seven percent by weight of the other solid components of the composite material, provides the desired binding effect. If the PVA is used in amounts in excess of seven percent, the resultant composite is undesirably stiff and has a "boardy" character. Other forms of PVA, e.g. powder, may also be used.

Another component which may optionally be included in the composite material is melamine formaldehyde resin, which serves as a supplemental binding agent. The melamine-formaldehyde resin is advantageously used in conjunction with the above-described cobeat. Melamine-formaldehyde resin suitable for use in the present invention is of the type described in U.S. Pat. Nos. 2,345,543 or 2,559,220, which is prepared by the condensation of melamine and formaldehyde in an aqueous acid medium. Resin of this type are available from Pioneer Plastics, Division of LOF Plastics, Inc., as an aqueous dispersion having 11% solid content. The amount of melamine-formaldehyde resin to be used in the composite material is generally less than three percent by weight of the other solid components of the composite material.

It is believed that the melamine-formaldehyde resin reacts with the cellulose fiber component of the cobeat to form stable linkages, which provide a high degree of wet strength to the web or sheet. The melamine-formaldehyde resin is non-ionic at the pH of the aqueous dispersion, which is about 7.5 to about 8.5.

A further optional component is an adhesive, elastomeric, colloidal latex, employed in an amount effective for improving retention of any particulate component during wet web or sheet formation and imparting flexibility to the finished paper-like element. The adhesive latex preferably has a solids content ranging from about 35 to about 55 percent and an average particle size of about 0.2 microns. It is non-ionic at a pH of 7.5 to 8.5.

A suitable adhesive, elastomeric, colloidal latex for use in practicing the present invention is an aqueous dispersion having a 50% solids content made by B.F. Goodrich Company, and sold under the name "Hycar 2671". In addition to reducing the tendency of the aqueous dispersion of acrylic polymers to lose particulate components during wet web or sheet formation and imparting flexibility to the finished paper-like element, the adhesive latex also serves to offset the stiffening effect produced by the organic binder.

A siloxane polymer may also be included in the composite material, if desired. The amount of siloxane polymer employed should be sufficient for aiding in the retention of any particulate component during wet web or sheet formation and in removal of the wet web or sheet from the porous support on which it is formed. As used herein, the term "siloxane polymer" refers to a linear chain structure of the general formula:

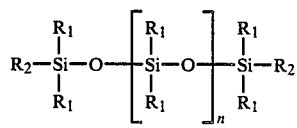

wherein $R_1$ is lower alkyl, preferably methyl and $R_2$ is lower alkyl or hydroxyl and n is equal to approximately 150. Also included within the term "siloxane polymer" are derivatives thereof substituted with various functional groups, such as aminoalkyl groups. Preferably the siloxane polymer has a solid content of approximately 30 percent and is non-ionic at a pH of 7.5 to 8.5.

Good results have been obtained using siloxane polymer in the form of an aqueous emulsion containing 30% solids, which is available from SUS Chemical Company, under the trade name "Uscosoft AF". This product contains a functional amine derived from ethylenediamine in which one nitrogen is attached to a silicon atom of the polymer chain in the above formula.

The siloxane polymer significantly aids in the release of the wet web from the porous support and improves particle retention during formation of the wet web. The siloxane polymer is also effective in providing additional binding effect in conjuction with the binding agent.

Various chemical additives, such as antioxidants, pigments, oxidizing agents, e.g. ammonium, sodium or potassium perchlorate and/or powdered aluminum oxide, bacteriocides, electromagnetic radiation absorption agents, fire retardants and the like may also be used, if desired.

The aqueous dispersion used in making the composite material of the present invention is conveniently prepared in a standard paper-making beater or similar mixing apparatus. Best results are obtained when a small amount of cobeat (on the order of from about two to six percent of the total disperse phase) is first added to the mixing apparatus, followed by the polymer micro-bits, and then the remaining components in any desired order. As previously noted, the cobeat facilitates formulation of a uniform aqueous dispersion of the composite components. The mixing time should be sufficient for obtaining a uniform dispersion, which normally requires about one to twenty minutes, depending on the formulation of the dispersion.

Conversion of the aqueous dispersion to a heat fusible sheet or web may be accomplished using conventional flat, slant-wire or cylinder-type paper making apparatus, i.e. those equipped with fourdrinier wires, cylinder molds, or combined machines includng both fourdrinier wires and cylinder molds. The process ordinarily involves thorough homogenization of the dispersion in a mixing chest to insure uniformity, application of the homogenizd dispersion to a porous substrate (usually an endless belt) to form the web or sheet, removal of the web or sheet from the porous substrate, and drying thereof. Of course, the drying step may include the application of pressure to the web or sheet to express water therefrom. The furnish should be applied to the forming surface of the paper-making machine at a rate of about 20 pounds to 150 pounds per 1300 square feet of finished material, depending on the drainage and drying capacity, which depends, in turn, on the composition of the material. Individual sheets may be made using an ordinary sheet mold. The finished web is normally passed over an open flame, high-pressure, steam-heated drums and through a hot-air tunnel for drying. The temperature required for drying of the web (or sheet) is normally in the range of about 275° F. to about 475° F. The final water content of the web or sheet should be less than about three percent, if cellulose is present, or less than about one percent if no cellulose is present.

Heat fusion of the sheet or web to produce the finished composite material may be carried out using heated platens or heated calenders operated at about 4000 to 6000 pounds pressure. Heating of the sheet or web at a temperature of about 430° F. for about fifteen to thirty seconds will usually be sufficient to cause the polymeric or resin component of the web or sheet to fuse. Slightly higher temperatures may be employed for shorter times, e.g. 440° F. for ten to fifteen seconds and vice versa. Of course, optimum conditions for heat fusion will depend on the thickness and composition of any particular sheet or web and may be emperically determined.

A plurality of individual sheets of the composite material may be heat fused to provide a monolithic stock material which may be converted by appropriate forming operations into various composite structures. Solid and hollow core panels may be easily prepared by the present invention. A void or hollow space is obtained by stamping out the central or interior portion of an appropriate number of the intermediate plies of composite material used in forming the finished product. The conditions for heat fusion are essentially the same as those described above with respect to the individual sheets or webs.

If any forming or machining operations are to be carried out on the composite material, e.g. die cutting, optimum efficiency is achieved by conducting such operations immediately after heat fusion, i.e. while the material is in a heated condition. Composite materials containing PTFE fibers have an extremely low coefficient of friction and are especially suited for the packing of shafts, e.g. pump shafts, notwithstanding the relative rigidity of the material. A suitable material for this purpose is exemplified below. The low friction coefficient of the material facilitates cutting in the form of an annulus, which may be severed at a single point or split into two semi-circles to allow for insertion around a shaft.

The following examples describe the invention in further detail, including the manner and process of making and using it and set forth the best mode contemplated by the inventor for carrying out his invention. All percentages, parts or proportions are by weight and all temperatures are in Fahrenheit degrees, unless otherwise indicated.

In addition, unless otherwise indicated, the following materials are employed in the examples:

| | |
|---|---|
| Polystyrene micro-bits = | Micro-bits prepared as described in Example 1 of my U.S. Pat. No. 4,207,378 |
| Polyethylene powder = | Hostalen ® GUR 412 |
| Polycarbonate resin powder = | Lexan ® (average particle size 275 microns) |
| Cobeat = | Blend of polystyrene micro-bits and cellulose fiber prepared as described in Example 1 of my U.S. Pat. No. 4,293,378 |
| Glass fiber = | DE-636 (Owens-Corning); ¼" long, 6–7 micron diameter |
| Aromatic polyamide fiber = | Kevlar ® 29 Wet Lap Aramid, 4 mm Type 979 |
| PTFE fiber = | Teflon ®; ¼" to ¾" long 12 micron diameter (approx) |
| Diatomaceous earth = | Hi-Flow Supercel |
| Silver-coated nylon fiber = | Product of Sousquoit Fibers, Inc. |
| Carbon fibers = | Panex TM; product of Stackpole Fibers, Lowell, MA |
| Stainless steel fibers = | 3/16" long, 4 micron diameter fiber (dimensions designed by manufacturer, N.V. Bekaert S.A.) |
| Polyvinyl alcohol binder = | Kuralon 105-2 (fiber form); 4 mm long |
| Melamine-formaldehyde resin = | Piomide; product of Pioneer Plastics, Auburn, Maine; 11% aqueous dispersion |
| Adhesive latex = | Hycar 2671 aqueous emulsion of mixed acrylic polymers, 50% total solids |
| Carbon particles = | Electrodag 230, fine particle carbon; 25% solid dispersion with density of 1.11 kg./l. |
| Anti-oxidant = | Heveamol C-100, aq. dispersion of hindered phenol, 45% active; product of Heveatex Co., Fall River, MA |
| Siloxane polymer = | Uscosoft AF, aqueous emulsion, 30% solids content. |

EXAMPLE 1

An agueous dispersion or furnish was prepared by adding the following components to 12 liters of water in a 5 gallon plastic container.

| Components | Amounts (dry wt. in gms.) |
|---|---|
| A. Matrix Phase | |
| Polystyrene micro-bits | 20 |
| Polyethylene powder | 60 |
| B. Reinforcement Phase | |
| Cellulose fibers[a] | 40 |
| Aromatic polyamide fiber | |
| Glass Fiber | 10 |
| Diatomaceous earth | 10 |
| C. Other Components | |
| Polyvinyl Alcohol binder | 3 |
| Anti-oxidant | 3 |

[a]Cotton linters with freeness of 610

The aqueous dispersion was stirred using an air driven three-bladed propeller-type stirrer for about twenty minutes prior to taking aliquots for sheet preparation.

Sheets were made from the foregoing furnish in a standard twelve inch by twelve inch sheet mold. In preparing the sheets 2500 ml. aliquots of the aqueous dispersion were added to approximately 8 gallons of water in the sheet mold. At least five uniform sheets were prepared, which exhibited no releasable polymer or resin component on the surface thereof. One of the sheets was dried by heating to a temperature of 240°–260° in a photographic sheet dryer and cut into 6 pieces, each measuring four inches by five inches. Two of the cut pieces were superimposed on one another and subjected to a temperature of 430° and a compresive force of 6000 pounds in a platen press for about 30 seconds. The heat fusion cycle was repeated as the remaining pieces of composite material were added to the previously fused sheets, so that all six were fused together to form a solid, monolithic block of high strength stock material, the composition of which was uniform throughout. No individual plies of the composite material were noticeable in the finished product, the polymer component having become thoroughly fused.

In order to determine the effect of the polymer micro-bits on the characteristics of the composite material, sample sheets were prepared from an aqueous dispersion which was essentially the same as that just described, but contained no polymer micro-bits. The exposed surface of the resultant sheet, i.e. the surface not facing the mold screen, was covered with loose polyethylene powder, which was readily released from the dry sheets.

EXAMPLES 2-11

Additional composite materials of the present inventions were prepared from the furnishes described in Table I below. The resulting paper-like sheets were hot pressed according to the general conditions described hereinbelow.

Multiple plies of the composite materials of example 2-7 and 10 were built up by hot pressing to provide monolithic blocks or panels of stock material, from which may be fabricated various useful composite structures. Several examples of stock materials prepared in accordance with the present invention are provided in Table II.

Although the composite materials described in the foregoing examples all include a powdered resin in addition to the polymer micro-bits, useful material may be made using polymer micro-bits as the sole component of the matrix phase. Such a material is described in the following example.

EXAMPLE 12

A thermoformable glass-resin paper was prepared from the following furnish, which was mixed in ten liters of water in a five gallon container.

| Components | Amounts (dry wt. in gms.) |
| --- | --- |
| A. Matrix Phase | |
| Polystyrene micro-bits | 81.6[a] |
| B. Reinforcement Phase | |
| Cellulose fibers[b] | 3.0 |
| Polyethylene terephthalate fibers[b] | 0.4 |
| Glass fiber[d] | 35[c] |
| Nylon fiber[d] | 30 |
| C. Other Components | |
| Polyvinyl alcohol | 5 |
| Adhesive latex | 5 |

[a]1.6 grams added as part of cobeat
[b]added as part of cobeat
[c]Includes 5 gms. of Evans 4100 glass micro-fibers (Evans Products Co., Corvalis, OR)
[d]66-type nylon (2 denier)

A 2000 ml. aliquot of the above furnish was taken and poured into approximately 8 gallons of water in a standard hand sheet mold. The resultant hand sheet was heated in a laboratory platen at 385° under a pressure of 6000 lbs. for 20–30 seconds. The hot pressed composite material had relatively good flexibility, but tended to crack upon creasing.

The above furnish was reformulated by including 100 grams of low molecular fine polyethylene powder and 30 added grams of DE glass fiber. Hand sheets were made and hot pressed under the same conditions as just described. The composite material thus produced exhibited no cracking tendency upon folding or creasing.

The following examples describe the preparation of relatively low cost composite materials.

EXAMPLE 13

An aqueous dispersion was prepared from the following components using the same general procedure described in Example 1 above, except that the dispersion was mixed in 14 liters of water.

| Components | Amounts (dry wt. in gms.) |
| --- | --- |
| A. Matrix Phase | |
| Polystyrene micro-bits | 26 |
| Polyethylene powder | 20 |
| Polycarbonate resin powder | 10 |
| B. Reinforcement Phase | |
| Cellulosic fibers | 60.8 |
| Glass fiber | 20 |
| Aromatic polyamide fiber | 5 |
| Diatomaceous earth | 20 |
| C. Other Components | |
| Polyvinyl alcohol binder | 5 |
| Anti-oxidant | 3 |

The cellulosic fiber used in the present example was in the form of a sludge produced as a waste product in paper-making. The sludge was obtained from Crane & Co., Dalton, Mass. on Oct. 25, 1985. The composition of paper-making sludge is subject to wide variation and is extremely difficult to determine. The composition on any given day depends on the type of paper produced in the mills in operation on that day. The sludge used in this example contained primarily cellulose fiber, with a relatively minor amount of glass fiber and other additives normally used in paper-making. Because of its poor drainage rate, paper-making sludge cannot be recycled economically, and is usually discarded.

Sheets were made from 3000 ml. aliquots of the furnish of this example by the procedure described in Example 1 above. The wet laid sheets exhibited good drainage and wet strength. A composite block composed of twenty plies of the resulting sheet material, and measuring 5"×5"×11/32" in finished form, was prepared according to the hot pressing procedure described in Example 1, under the followiong conditions: 6000 lbs. pressure; 25 seconds; 435° F. The finished block weighed 135 gms.

EXAMPLE 14

A low cost, high strength composite was prepared from a hardwood pulp. Preliminarily, a cobeat was prepared by heating together 1400 gms. of hardwood Oxybrite Craft and 600 gms. of polystyrene micro-bits in 67 liters of water following the general procedure described above. After beating for approximately one hour and fifteen minutes, the freeness of the cobeat decreased to 600, from a initial value of 850. The cobeat had a solids content of about 3%.

A furnish was prepared by adding 300 ml. of the resulting cobeat (approx. 9 gms. dry weight) to 14 liters of water in a 5 gallon container, after which the following components were added:

| Components | Amounts (dry wt. in gms.) |
| --- | --- |
| A. Matrix Phase | |
| Polystyrene micro-bits | 28 |
| Polyethylene powder | 20 |
| Polycarbonate resin powder | 10 |
| B. Reinforcement Phase | |
| Hardwood pulp fiber | 42 |
| Diatomaceous earth | 20 |
| Glass fiber | 10 |
| C. Other Components | |
| Polyvinyl alcohol binder | 5 |

| Components | Amounts (dry wt. in gms.) |
|---|---|
| -continued | |
| Anti-oxidant | 3 |

Sheets were made from 3000 ml. aliquots of the furnish of this example by the procedure described in Example 1, above. The sheets retained considerable water, but could be converted to composite materials nonetheless. A composite block composed of twenty plies of the resultant sheet material, measuring 5"×5"×¼" in finished form, was prepared under the same conditions described in Example 10. The production cost of this composite structure is estimated to be approximately $.80 per pound.

The following examples describe the preparation of composite components requiring special processing or conditioning in order to render them dispersible in a furnish system.

EXAMPLE 15

Cereal grasses such as the rice straw employed in Example 5 must be at least partially refined to provide fibers suitable for incorporation into a composite material. Rice straw has a composition of about 20% silica, 30% lignin, 20% soluble hemi-cellulose and about 30% fibrous cellulose available for paper-making. It has been found that rice straw processed in a conventional beater as described in this example, yields fiber suitable for use in a composite formulation.

Into a Hollander beater having a five pound capacity were placed 2000 grams of cut rice straw (average length one inch), 400 grams (dry weight) of polystyrene micro-bits and 85 liters of water. Initially a five pound weight was set on the pivot arm. Additional five pound weights were added at fifteen minute intervals during the one hour beater run. An excellent dispersion of rice straw fiber was obtained.

The addition of the micro-bits to the beater was found to be essential for obtaining usable rice straw fiber. A similar beater run without the micro-bits reduced the rice straw to a finely divide, dispersed, non-filterable product, which was completely unsuitable for making composites.

Rice straw may also be conveniently processed in a ball mill using micro-bits as a milling aid.

EXAMPLE 16

The stainless steel fibers used in the composite of Example 11 were processed in a ball mill in order to impart thereto the necessary degree of dispersibility for formulating the furnish. Into a standard laboratory ball mill having a 1.7 liter capacity were placed 10 grams (dry weight) of polystyrene micro-bits, 40 grams of the stainless steel fiber, about 1.3 liters of water, and approximately equal amounts of steel balls (measuring 1 in. or ½ in. in diameter) and ceramic cylinders (measuring ½ in length and ⅜" around), so as to fill approximately 75 percent of the capacity of the ball mill. The micro-bits were used as a milling aid. If the micro-bits are not used, metal fibers agglomerates are produced. After running the mill for about one day, a uniform aqueous dispersion of the stainless steel fibers was obtained, which could be used directly for making the furnish for the stainless steel fiber-containing composite material.

While certain presently preferred embodiments of this invention have been described and exemplified herein above, it is not intended to limit the invention to such embodiments, as various modifications may be made therein and thereto without departing from the spirit and scope of the invention as set forth in the following claims.

TABLE I

| Composite Components | Example No. | | | | |
|---|---|---|---|---|---|
| | 2 | 3 | 4 | 5 | 6 |
| A. Matrix Phase | | | | | |
| 1. Polymer styrene micro-bits[a] | 21.9 gms. | 18.4 gms. | 21.9 gms. | 21.9 gms. | 21.9 gms. |
| 2. Polyethylene powder | 30 gms. | 8.4 gms. | 30 gms. | 30 gms. | 30 gms.[b] |
| 3. Polycarbonate resin powder | X | 17 gms. | X | X | X |
| B. Reinforcement Phase | | | | | |
| 1. Cellulose fiber[c] | 3.7 gms. | 43 gms.[c1] | 3.7 gms. | 3.7 gms. | 3.7 gms. |
| 2. Polyethylene terephthalate fiber c | 0.4 gms. | 0.35 gms. | 0.4 gms. | 0.4 gms. | 0.4 gms. |
| 3. Glass fiber | X | X | 10 gms. | 10 gms. | X |
| 4. Aromatic polyamide fiber | 20 gms. | 10 gms.[d] | 10 gms. | 10 gms | 25 gms. |
| 5. PTFE fiber | 30 gms. | X | X | X | X |
| 6. Diatomaceous Earth | X | 3 gms. | 10 gms. | 10 gms. | 5 gms. |
| 7. Aluminum Oxide ($Al_2O_3$) | X | 200 gms.[e] | X | X | X |
| 8. Wood Powder[f] | X | X | 30 gms. | X | X |
| 9. Processed rice-straw fiber[g] | X | X | X | 40 gms. | X |
| 10. Silver-coated nylon fiber | X | X | X | X | X |
| 11. Carbon fiber | X | X | X | X | X |
| 12. Stainless steel fiber | X | X | X | X | X |
| C. Other Components | | | | | |
| 1. PVA | 4 gms. | 2.5 gms. | 3 gms. | 3 gms. | 4 gms. |
| 2. Melamine-formaldehyde resin | 1.1 gms. | 5.0 gms. | 5.5 gms. | 2.2 gms. | 1.3 gms. |
| 3. Adhesive latex | 5 gms. | 10 gms | 10 gms. | 10 gms. | 6 gms. |
| 4. Carbon particles | 2.5 gms. | X | X | X | X |
| 5. Anti-oxidant | 3 gms. | 2.5 gms. | 3 gms. | 3 gms. | 3.6 gms. |
| 6. Siloxane polymer | 1.5 gms. | 0.3 gms. | 1.5 gms. | 1.5 gms. | X |

TABLE I-continued

| Composite Components | Example No. | | | | |
|---|---|---|---|---|---|
| | 7 | 8 | 9 | 10 | 11 |
| A. Matrix Phase | | | | | |
| 1. Polymer styrene micro-bits[a] | 21.9 gms. | 21.9 gms. | 31.9 gms. | 21.9 gms. | 7.8 gms. |
| 2. Polyethylene powder | 30 gms. | 15 gms. | 20 gms. | 30 gms. | X |
| 3. Polycarbonate resin powder | X | 25 gms. | X | X | X |
| B. Reinforcement Phase | | | | | |
| 1. Cellulose fiber[c] | 3.7 gms. | 3.7 gms. | 3.7 gms. | 3.7 gms. | 2.4 gms. |
| 2. Polyethylene terephthalate fiber c | 0.4 gms. | 0.4 gms. | 0.4 gms. | 0.4 gms. | .26 gms. |
| 3. Glass fiber fiber | 15 gms. | 15 gms. | 5 gms. | 10 gms. | X |
| 4. Aromatic polyamide | 45 gms. | 25 gms. | 30 gms. | 25 gms. | 4.2 gms. |
| 5. PTFE fiber | X | X | X | X | X |
| 6. Diatomaceous Earth | 10 gms. | 10 gms. | 5 gms. | 5 gms. | X |
| 7. Aluminum Oxide ($Al_2O_3$) | X | X | X | X | X |
| 8. Wood Powder[f] | X | X | X | X | X |
| 9. Processed rice-straw fiber[g] | X | X | X | X | X |
| 10. Silver-coated nylon fiber | X | X | 30 gms. | X | X |
| 11. Carbon fiber | X | X | X | 0.21 gms. | 10 gms. |
| 12. Stainless steel fiber | X | X | X | X | 26.5 gms. |
| C. Other Components | | | | | |
| 1. PVA | 3 gms. | 3 gms. | 4 gms. | 3 gms. | 3.3 gms. |
| 2. Melamine-formaldehyde Resin | 1.1 gms. | 1.1 gms. | 1.1 gms. | 1.1 gms. | X |
| 3. Adhesive latex | 5 gms. | 5 gms. | 5 gms. | 5 gms. | X |
| 4. Carbon particles | X | X | X | X | X |
| 5. Anti-oxidant | 3 gms. | 3 gms. | 3 gms. | 3 gms. | X |
| 6. Siloxane polymer | 3 gms. | 3 gms. | 1.5 gms. | X | X |

[a]Less than 2 gms. added as part of cobeat
[b]Low molecular weight polyethylene fine powder (Dow Co.)
[c]Added as part of cobeat unless otherwise indicated
[d]Only 3.0 gms. added as part cobeat; balance cellulose long fiber (5% consistency)
[d]Nomex ® (du Pont); ¼" length (approx.)
[e]Equal amounts of 240 mesh and 100 mesh particles
[f]Common saw dust from carpentry shop
[g]Prepared as described in Example 15, below

TABLE II

| Stock Material of: | Conditions (Temp./PF/ Time, secs.) | Number of Plies | Overall Dimensions (approx.) | Properties | Applications |
|---|---|---|---|---|---|
| Ex. 1 | 420/4000/15 | 45 | 3.5 × 3.5 × 0.4 ins. | High strength, tough material | Substitute for metal structure |
| Ex. 2 | 420/4000/15 | 90 | 3.5 × 3.5 × 0.75 ins. | Sp. gr. 1.11; easily machinable; low friction | Pump packing |
| Ex. 3 | 430/6000/15 | 40 | 3.5 × 3.5 × 0.3 ins. | Abrasive; small heat evolution; good physical integrity | Grinding or polishing wheel |
| Ex. 4 | 430/6000/30–40 | 45 | 3.5 × 3.5 × 0.4 | Easily cut, drilled and glued; water resistant; good dimensional stability | Furniture board |
| Ex. 5 | 410/45000/25 | 34 | 12 × 12 × 0.25–0.3 ins. | Toughness and rigidity | Hardwood substitute |
| Ex. 6 | 410/3000/20 | 45 | 3.5 × 3.5 × 0.4 ins. | High strength and rigidity | Bullet-proof shield |
| Ex. 7 | 430/5000/15 | 45 | 3.5 × 3.5 × 0.4 ins. | High strength and rigidity | Bullet-proof shield |
| Ex. 10 | 430/6000/20 | 18 | 5 × 5 × 0.2 ins. | Uniform distribution of carbon fibers in finished panel | Electronics; high frequency receiver |

What is claimed is:

1. An aqueous dispersion for the production of composite material in the form of a sheet or web comprising a continuous matrix phase which surrounds a reinforcement phase composed of discrete reinforcing elements, the disperse phase of said aqueous dispersion including (i) polymer micro-bits produced from an expanded, hydrophobic, thermoplastic polymer which is non-brittle in expanded form, said polymer micro-bits being substantially completely free of intact cells of the expanded polymer from which they are produced, (ii) at least one finely divided, hydrophobic, heat fusible resin, and (iii) said reinforcing elements.

2. Aqueous dispersion according to claim 1, wherein the heat fusible resin is selected from the group of polycarbonates, polyolefins, including low and high molecular weight polyethylene and polypropylene and co-polymers thereof, polyester, nylon, polyacetals, chloropolymers, including chlorinated ethylene and polyvinyl chloride, fluoropolymers, including polytetrafluoroethylene, acrylic resins, acrylonitrile-butadiene-styreene (A.B.S.) polymers or copolymers thereof.

3. Aqueous dispersion according to claim 1, wherein the expanded, hydrophobic, thermoplastic polymer is selected from the group of a styrene polymer, a lower polyolefin which is the polymer of an ethylenically unsaturateed hydrocarbon monomer having from 2 to 6 carbon atoms, or co-polymers or blends of said polymers.

4. Aqueous dispersion according to claim 1, including a fibrous reinforcing element selected from the group of glass, carbonaceous, polymer, inorganic, and metal fibers.

5. Aqueous dispersion according to claim 4, wherein the fibrous reinforcing element comprises cellulosic fiber.

6. Aqueous dispersion according to claim 5, wherein a portion of the polymer micro-bits component of the disperse phase is intimately blended with cellulose fibers to form a cobeat.

7. Aqueous dispersion according to claim 6, wherein said cobeat comprises about 35 to about 50 weight percent of polymer micro-bits and from about 50 to about 65 weight percent of cellulose fiber.

8. Aqueous dispersion according to claim 6, wherein polyester fiber is included in the cobeat.

9. Aqueous dispersion according to claim 8, wherein the polyester fiber is polyethylene terephthalate fiber.

10. Aqueous dispersion according to claim 5, wherein there is included a compatible binding agent in an amount effective for binding together the components of the disperse phase in sheet or web form.

11. Aqueous dispersion according to claim 10, wherein the binding agent is polyvinyl alcohol, optionally including a minor amount of melamine-formaldehyde resin.

12. Aqueous dispersion according to claim 1, wherein the disperse phase includes a particulate reinforcing element selected from the group of diatomaceous earth, polyurethane micro-bits, aluminum oxide, wood flour, saw dust, carbon powder, silicon dioxide, calcium carbonate, mica, and clay.

13. Aqueous dispersion according to claim 2, wherein the disperse phase includes a particulate reinforcing element selected from the group of diatomaceous earth, polyurethane micro-bits, aluminum oxide, wood flour, saw dust, carbon powder, silicon dioxide, calcium carbonate, mica, and clay.

14. A sheet or web prepared from the aqueous dispersion of claim 1, which is capable of being heat fused into a composite material.

15. A sheet or web prepared from the aqueous dispersion of claim 2, which is capable of being heat fused into a composite material.

16. A sheet or web prepared from the aqueous dispersion of claim 3, which is capable of being heat fused into a composite material.

17. A sheet or web prepared from the aqueous dispersion of claim 4, which is capable of being heat fused into a composite material.

18. A sheet or web prepared from the aqueous dispersion of claim 5 which is capable of being heat fused into a composite material.

19. A sheet or web prepared from the aqueous dispersion of claim 6 which is capable of being heat fused into a composite material.

20. A sheet or web prepared from the aqueous dispersion claim 7 which is capable of being heat fused into a composite material.

21. A sheet or web prepared from the aqueous dispersion of claim 8 which is capable of being heat fused into a composite material.

22. A sheet or web prepared from the aqueous dispersion of claim 9 which is capable of being heat fused into a composite material.

23. A sheet or web prepared from the aqueous dispersion of claim 10 which is capable of being heat fused into a composite material.

24. A sheet or web prepared from the aqueous dispersion of claim 11 which is capable of being heat fused into a composite material.

25. A sheet or web prepared from the aqueous dispersion of claim 12 which is capable of being heat fused into a composite material.

26. A sheet or web prepared from the aqueous dispersion of claim 13 which is capable of being heat fused into a composite material.

* * * * *